(12) United States Patent
Im et al.

(10) Patent No.: US 10,615,434 B2
(45) Date of Patent: Apr. 7, 2020

(54) COMPOSITION FOR SOLID OXIDE FUEL CELL SEALANT, SEALANT USING SAME AND METHOD FOR PREPARING SAME

(71) Applicant: LG CHEM, LTD., Seoul (KR)

(72) Inventors: Sanghyeok Im, Daejeon (KR); Dong Oh Shin, Daejeon (KR); Jong Woo Kim, Daejeon (KR); Kwangwook Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 67 days.

(21) Appl. No.: 15/736,452

(22) PCT Filed: Sep. 9, 2016

(86) PCT No.: PCT/KR2016/010165
§ 371 (c)(1),
(2) Date: Dec. 14, 2017

(87) PCT Pub. No.: WO2017/047995
PCT Pub. Date: Mar. 23, 2017

(65) Prior Publication Data
US 2018/0191004 A1 Jul. 5, 2018

(30) Foreign Application Priority Data
Sep. 15, 2015 (KR) .......... 10-2015-0130378

(51) Int. Cl.
| | | |
|---|---|---|
| H01M 8/0282 | (2016.01) | |
| H01M 8/0286 | (2016.01) | |
| C03C 3/064 | (2006.01) | |
| H01M 8/1246 | (2016.01) | |
| C03C 8/24 | (2006.01) | |
| C03C 3/066 | (2006.01) | |
| C03C 8/08 | (2006.01) | |
| H01M 8/124 | (2016.01) | |

(52) U.S. Cl.
CPC .......... H01M 8/0282 (2013.01); C03C 3/064 (2013.01); C03C 3/066 (2013.01); C03C 8/08 (2013.01); C03C 8/24 (2013.01); H01M 8/0286 (2013.01); H01M 8/1246 (2013.01); *C03C 2205/00* (2013.01); *H01M 2008/1293* (2013.01); *Y02E 60/525* (2013.01); *Y02P 70/56* (2015.11)

(58) Field of Classification Search
None
See application file for complete search history.

(56) References Cited

U.S. PATENT DOCUMENTS

| | | | | |
|---|---|---|---|---|
| 2010/0233567 | A1* | 9/2010 | Larsen ...................... | C03C 8/24 429/469 |
| 2011/0269059 | A1* | 11/2011 | Mukerjee ............ | H01M 8/0206 429/535 |

FOREIGN PATENT DOCUMENTS

KR   10-1457614 B1   11/2014

OTHER PUBLICATIONS

Flugel et al., "Development of an Improved Devitrifiable Fuel cell Sealing Glass", Journal of the Electrochemical Society, vol. 154, No. 6, 2007, pp. B601-B608. (Year: 2007).*

(Continued)

*Primary Examiner* — Karie O'Neill Apicella
(74) *Attorney, Agent, or Firm* — Birch, Stewart, Kolasch & Birch, LLP

(57) ABSTRACT

The present specification relates to a composition for a solid oxide fuel cell sealant including $P_2O_5$, a sealant using the same and a method for manufacturing the same.

15 Claims, 2 Drawing Sheets

(56) References Cited

OTHER PUBLICATIONS

Flügel et al., "Development of an Improved Devitrifiable Fuel Cell Sealing Glass," Journal of the Electrochemical Society, vol. 154, No. 6, 2007 (Available electronically Apr. 25, 2007), pp. B601-B608.

* cited by examiner

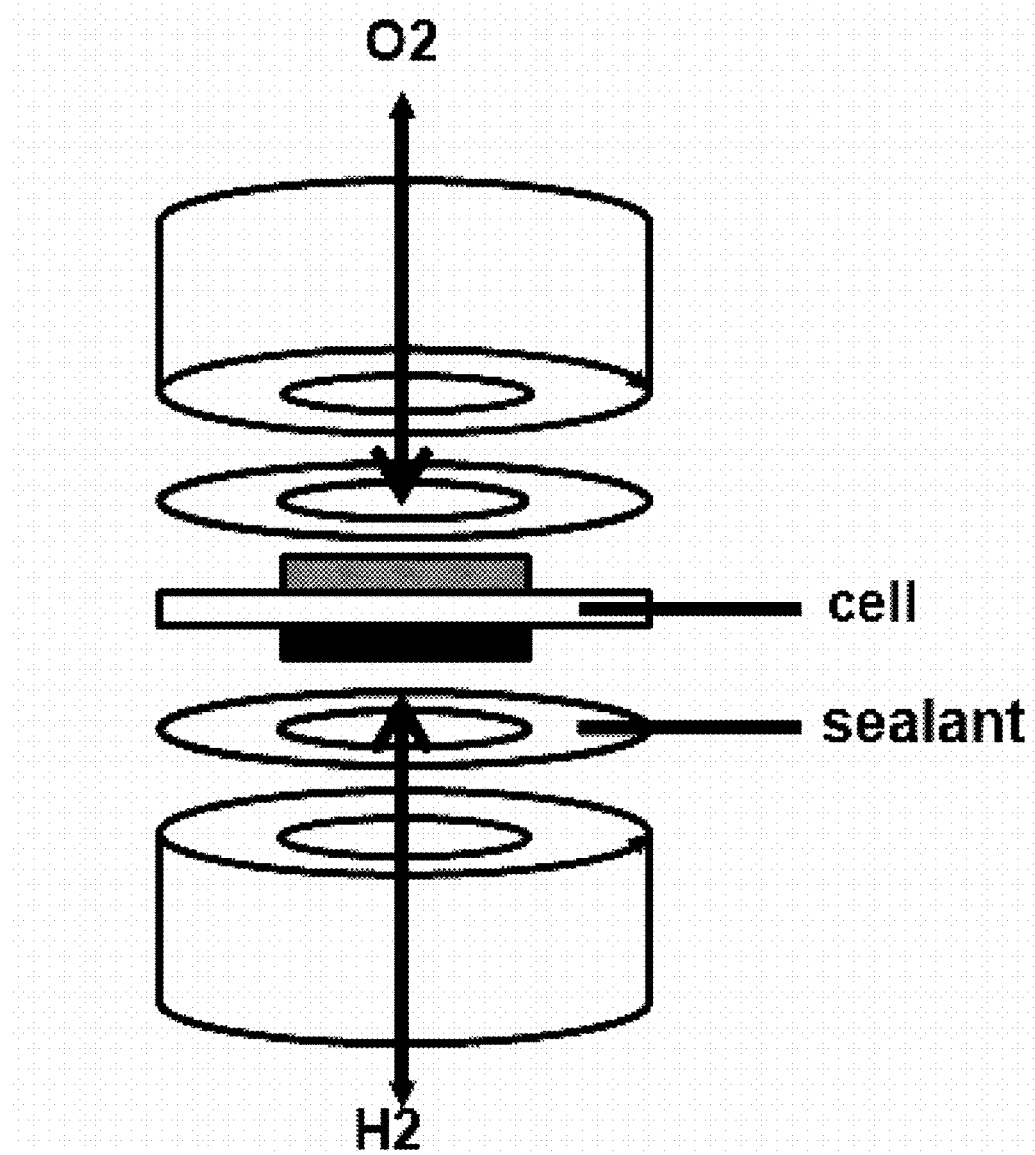

[FIG. 2]
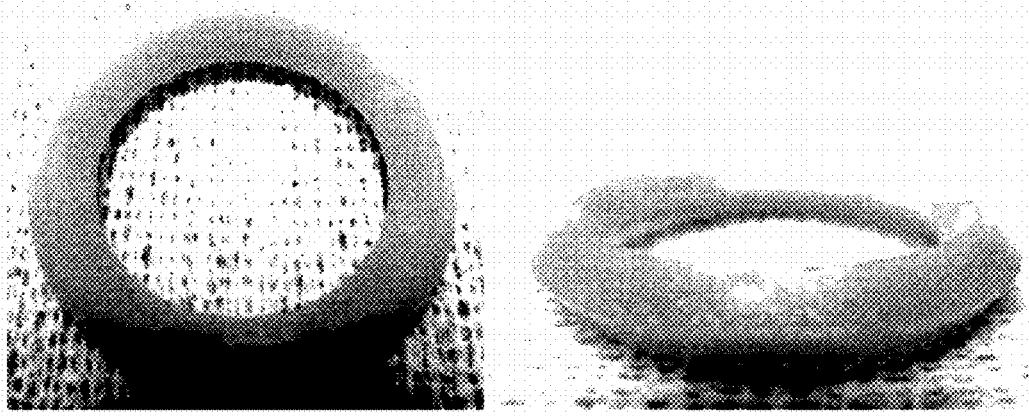
[FIG. 3]
(a)  (b)
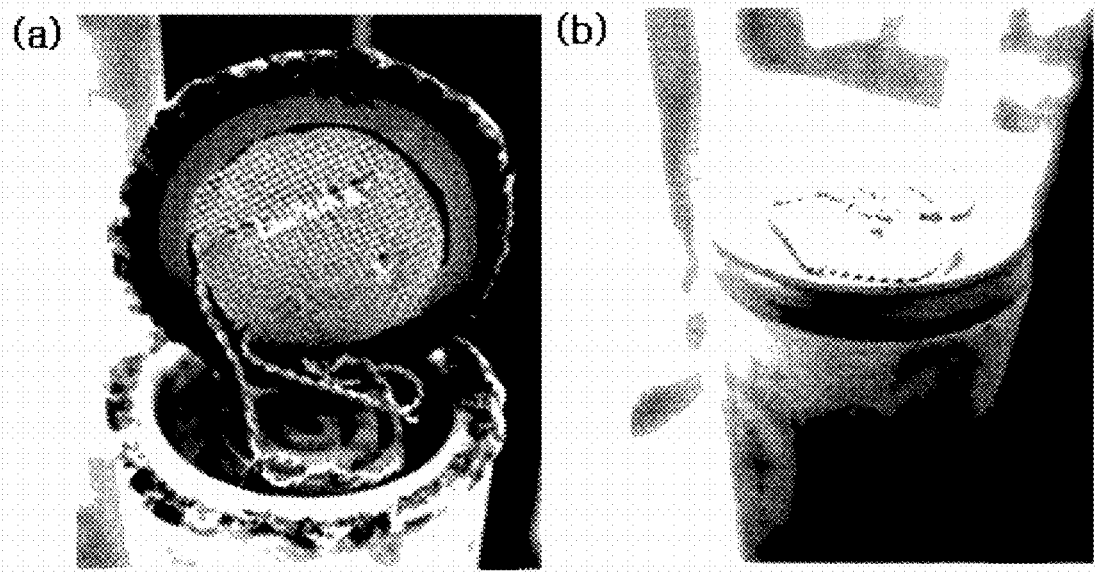

COMPOSITION FOR SOLID OXIDE FUEL CELL SEALANT, SEALANT USING SAME AND METHOD FOR PREPARING SAME

TECHNICAL FIELD

The present specification relates to a composition for a solid oxide fuel cell sealant, a sealant using the same and a method for manufacturing the same.

BACKGROUND ART

With recent predictions about the exhaustion of existing energy resources such as petroleum and coal, interests in energy capable of replacing these have been growing. As one of such alternative energy, fuel cells have received particular attention with advantages of being highly efficient, not emitting pollutants such as NOx and SOx, and having sufficient fuel to use.

Fuel cells are a power generating system converting chemical reaction energy of fuel and oxidizer to electric energy, and hydrogen, methanol and hydrocarbon such as butane are used as the fuel, and oxygen is typically used as the oxidizer.

Fuel cells include polymer electrolyte membrane-type fuel cells (PEMFC), direct methanol-type fuel cells (DMFC), phosphoric acid-type fuel cells (PAFC), alkaline-type fuel cells (AFC), molten carbonate-type fuel cells (MCFC), solid oxide-type fuel cells (SOFC) and the like.

Among these, solid oxide fuel cells are based on low activated polarization and thereby have low overvoltage, and have small irreversible loss, and accordingly, have high power generation efficiency. In addition, carbon or hydrocarbon-based materials may be used as fuel as well as hydrogen leading to a wide fuel choice, and high-priced precious metals are not required as an electrode catalyst since reaction rates in electrodes are high. Besides, temperatures of heat released incidental to the power generation are very high, which is highly useful. In other words, heat generated in a solid oxide fuel cell may be used not only in fuel reformation, but also as an energy source for industry or cooling in a cogeneration system.

When examining a basic operation principle of such a solid oxide fuel cell (SOFC), a solid oxide fuel cell is basically a device generating power through an oxidation reaction of hydrogen, and an electrode reaction as in the following Reaction Formula 1 is progressed in an anode that is a fuel electrode and a cathode that is an air electrode.

Air electrode: $(½)O_2+2e^-\rightarrow O^{2-}$ 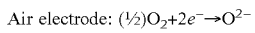

Fuel electrode: $H_2+O^{2-}\rightarrow H_2O+2e^-$ 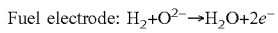

Whole Reaction: $H_2+(½)O_2\rightarrow H_2O$ 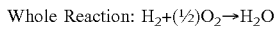 [Reaction Formula 1]

In other words, electrons reach an air electrode through an external circuit, and at the same time, oxygen ions generated in the air electrode are transferred to a fuel electrode through an electrolyte, and in the fuel electrode, hydrogen and the oxygen ions bond to produce electrons and water.

Meanwhile, a solid oxide fuel cell is formed with a unit cell including an air electrode, an electrolyte and a fuel electrode, and a stack is formed by laminating a number of these unit cells. For such lamination, an air electrode in one unit cell and a fuel electrode in another unit cell need to be electrically connected, and a structure capable of supplying fuel and air to each unit cell is required, and for this, a separator made of a metal is used. Herein, in this fuel cell stack, sealing between the metal separator and constituents of the unit cell is important in order to prevent mixing of hydrogen, a fuel gas, and air, a combustion gas, to prevent a gas leak outside the stack, and for insulation between the unit cells.

In other words, such fuel gas and air need to move through a fixed path, and when the fuel gas and the air are mixed or leaked outside, battery performance rapidly declines, and therefore, a high level of sealing technology is required.

PRIOR ART DOCUMENTS

Patent Documents

Korean Patent No. 0590968

DISCLOSURE

Technical Problem

The present specification is directed to providing a composition for a solid oxide fuel cell sealant, a sealant using the same and a method for manufacturing the same.

Technical Solution

One embodiment of the present specification provides a composition for a solid oxide fuel cell sealant including $P_2O_5$.

One embodiment of the present specification provides a solid oxide fuel cell sealant including the composition for a solid oxide fuel cell sealant described above.

One embodiment of the present specification provides a method for manufacturing a sealant for a solid oxide fuel cell including providing the composition for a solid oxide fuel cell sealant described above; melting the composition for a sealant; preparing glass for a sealant by slowly cooling the melted composition for a sealant; preparing powder by crushing the glass for a sealant; preparing a product for a sealant by placing the powder in a mold and extrusion molding; and sintering the product for a sealant.

One embodiment of the present specification provides a solid oxide fuel cell including a cell of a solid oxide fuel cell including a fuel electrode, an electrolyte and an air electrode; the solid oxide fuel cell sealant described above provided on an upper surface and a lower surface of the cell of the fuel cell; and a separator provided on an upper surface and a lower surface of the sealant.

One embodiment of the present specification provides a method for manufacturing a solid oxide fuel cell including preparing a cell of a solid oxide fuel cell including a fuel electrode, an electrolyte and an air electrode; laminating the sealant for a solid oxide fuel cell described above on an upper surface and a lower surface of the cell of the solid oxide fuel cell; and heating a laminate in which the sealant is laminated in each of the upper surface and the lower surface of the cell of the solid oxide fuel cell.

Advantageous Effects

According to one embodiment of the present specification, a separate organic substance removing process for removing organic substances present in a sealant is not required, which is effective in reducing manufacturing costs.

In addition, according to one embodiment of the present specification, bubbles caused by organic substances are not produced during a manufacturing process of a sealant for a solid oxide fuel cell, and therefore, a problem of defects caused by gas leaks can be resolved.

In addition, according to one embodiment of the present specification, adhesive strength of a sealant for a solid oxide fuel cell in an attaching process at a high temperature is enhanced, which is effective in enhancing sealing performance.

In addition, a sealant for a solid oxide fuel cell according to one embodiment of the present specification has a similar thermal expansion behavior with a substrate attached when manufacturing a fuel cell and thereby is effective in preventing breakage defects.

In addition, a sealant for a solid oxide fuel cell according to one embodiment of the present specification is a material having strong chemical resistance, which is effective in obtaining long-term durability.

In addition, according to one embodiment of the present specification, a temperature attaching a sealant to upper and lower parts of a cell is proper, which is effective in preventing degeneration of other constituents during a sealant binding process.

In addition, a sealant for a solid oxide fuel cell according to one embodiment of the present specification does not include an alkali metal oxide, which is effective in obtaining excellent chemical durability and excellent long-term durability of the sealant.

DESCRIPTION OF DRAWINGS

FIG. 1 mimetically illustrates a structure of a solid oxide fuel cell according to one embodiment of the present specification.

FIG. 2 illustrates a structure of a sealant for a solid oxide fuel cell according to one embodiment of the present specification.

FIG. 3(a) shows a result of observing an adhesion status of a sealant manufactured using a composition for a sealant including an organic substance binder or a solvent as in preparation methods in the art, and FIG. 3(b) shows a result of observing an adhesion status of a sealant manufactured using a composition for a sealant according to one embodiment of the present specification.

MODE FOR DISCLOSURE

Hereinafter, the present specification will be described in more detail.

In the present specification, a description of one member being placed "on" another member includes not only a case of the one member adjoining the another member but a case of still another member being present between the two members.

In the present specification, a description of a certain part "including" certain constituents means capable of further including other constituents, and does not exclude other constituents unless particularly stated on the contrary.

One embodiment of the present specification provides a composition for a solid oxide fuel cell sealant including $P_2O_5$.

A biggest problem in commercializing a solid oxide fuel cell may be gas sealing. As for current sealing technologies of a solid oxide fuel cell, using a glass-based sealant may be considered as a most typical method.

As the method of using a glass-based sealant in the art, a method of using glass powder in a form of tape or paste and using each in a cell of a fuel cell has been generally used. In other words, a form of tape or paste is normally used in order to be initially attached to a cell of a fuel cell.

However, when preparing a sealant in the form of tape or paste, organic substances such as a binder or a solvent are included therein in addition to glass powder, and a separate process removing the organic substances is required in a sealant manufacturing process. In addition, even when such an organic substance-removing process is included, a gas leak occurs due to bubbles generated during the organic substance-removing process, which leads to a problem of product defects.

In view of the above, the inventors of the present disclosure have, in using a sealant for a solid oxide fuel cell, accomplished the present disclosure manufacturing a sealant using a composition for a sealant famed only with glass-based materials instead of a common tape or paste form.

According to one embodiment of the present specification, the sealing composition is formed only with glass-based materials without including organic substances when manufacturing the sealant for a solid oxide fuel cell using the method as described above, and therefore, no bubbles caused by organic substances are generated during a manufacturing process, which is effective in improving a problem of causing product defects due to a gas leak.

In other words, according to one embodiment of the present specification, the composition for a solid oxide fuel cell sealant may not include organic substances such as a binder or a solvent, and after manufacturing a sealant using such a composition for a sealant with no organic substances, the sealant may be used in a fuel cell right away, and since no bubbles caused by organic substances are generated during a sealant manufacturing process, a problem of product defects caused by bubble generation may be resolved.

According to one embodiment of the present specification, the composition for a sealant may include $P_2O_5$ in 1 mol % to 10 mol % and more preferably in 5 mol % to 10 mol % based on the content of the whole composition for a sealant.

According to one embodiment of the present specification, in the composition for a sealant, including the $P_2O_5$ in 1 mol % or greater based on the content of the whole composition for a sealant is effective in preventing adhesion defects caused by a decrease in the sealant surface adhesive strength, and including the $P_2O_5$ in 10 mol % or less is effective in preventing a problem of defects caused by glass flowing down due to a decrease in the sealant viscosity.

According to one embodiment of the present specification, the sealant may further include a glass-based material. In addition, according to one embodiment of the present specification, the sealant may be formed only with $P_2O_5$ and a glass-based material.

In the present specification, the glass-based material does not necessarily include SiO only, and may include metal oxides or nonmetal oxides. In addition, materials commonly used as a glass-based material in manufacturing a sealant of a solid oxide fuel cell may be used, and are not particularly limited.

According to one embodiment of the present specification, the composition for a sealant may include a glass-based material, and for example, the composition for a sealant may further include one or more materials selected from the group consisting of $SiO_2$, $B_2O_3$, $Al_2O_3$, ZnO, CaO, BaO and SrO. However, the composition for a sealant does not include organic substances, and the organic substance may mean a solvent or a binder.

According to one embodiment of the present specification, the composition for a sealant may be formed with one or more materials selected from the group consisting of $SiO_2$, $B_2O_3$, $P_2O_5$, ZnO, CaO and BaO. Alternatively, according to one embodiment of the present specification, the composition for a sealant may be formed with one or more materials selected from the group consisting of $SiO_2$, $B_2O_3$, $P_2O_5$, ZnO, CaO, BaO and SrO. Alternatively, according to one embodiment of the present specification, the composition for a sealant may be formed with one or more materials selected from the group consisting of $SiO_2$, $B_2O_3$, $P_2O_5$, $Al_2O_3$, ZnO, CaO and BaO. Alternatively, according to one embodiment of the present specification, the composition for a sealant may be formed with one or more materials selected from the group consisting of $SiO_2$, $B_2O_3$, $P_2O_5$, $Al_2O_3$, ZnO, CaO, BaO and SrO.

According to one embodiment of the present specification, the composition for a sealant may include $SiO_2$ in 12 mol % to 33 mol % based on the content of the whole composition for a sealant. In the composition for a sealant, $SiO_2$ is a former oxide forming a network structure forming glass, and may contribute to increasing chemical durability of glass and obtaining a low coefficient of thermal expansion.

Herein, the composition for a sealant according to one embodiment of the present specification including $SiO_2$ in 12 mol % or greater based on the content of the whole composition is effective in preventing problems of decreasing chemical durability, increasing density, increasing a coefficient of thermal expansion and greatly increasing a melting temperature occurring when the $SiO_2$ content is too low, and including $SiO_2$ in 33 mol % or less is effective in preventing a problem of a glass devitrification property becoming inferior caused by an excessive decrease in the coefficient of thermal expansion.

According to one embodiment of the present specification, the composition for a sealant may include $SiO_2$ in 12 mol % to 33 mol %, $B_2O_3$ in 25 mol % to 40 mol %, $P_2O_5$ in 5 mol % to 10 mol %, ZnO in 5 mol % to 11 mol %, CaO in 5 mol % to 12 mol %, and BaO in 5 mol % to 10 mol % based on the content of the whole sealant composition.

According to one embodiment of the present specification, the composition for a sealant may further include $Al_2O_3$ in greater than 0 mol % and less than or equal to 10 mol % based on the content of the whole sealant composition.

In addition, according to one embodiment of the present specification, the composition for a sealant may further include SrO in greater than 0 mol % and less than or equal to 13 mol % based on the content of the whole sealant composition.

In addition, according to one embodiment of the present specification, the composition for a sealant may have a value adding up the content of the CaO and the ZnO in a range of 5 mol % to 20 mol %.

In addition, according to one embodiment of the present specification, the composition for a sealant may have a value adding up the content of the BaO and the SrO in a range of 9 mol % to 18 mol %.

According to one embodiment of the present specification, in the composition for a sealant, BaO may contribute to enhancing chemical resistance or devitrification property of glass. However, BaO being included in an excessively high amount may increase glass density and may have adverse influence on the environment. Meanwhile, when the BaO content is too low, the effects of BaO addition may not be properly achieved. Comparably, SrO is an alkaline earth metal oxide, and may contribute to enhancing devitrification property and acid resistance of glass. However, when SrO is included in an excessively high amount, a thermal expansion coefficient or density may increase, and a devitrification property may go through degradation. Meanwhile, when SrO is included in an excessively low amount, the effects of SrO addition as described above may not be properly achieved.

According to one embodiment of the present specification, the composition for a sealant may have a thermal expansion coefficient value in a range of $8 \times 10^{-6}$/K to $12 \times 10^{-6}$/K.

According to one embodiment of the present specification, when the composition for a sealant has a thermal expansion coefficient in a range of $8 \times 10^{-6}$/K to $12 \times 10^{-6}$/K, a thermal expansion coefficient difference with a subject to adhere is small resulting in no residual stress, which is effective for stable adhesion.

In addition, according to one embodiment of the present specification, a glass transition temperature ($T_g$) of the composition for a sealant may be in a range of 450° C. to 600° C. after curing, and more preferably in a range of 500° C. to 600° C. According to one embodiment of the present specification, when the composition for a sealant has a glass transition temperature in a range of 450° C. to 600° C., it is a temperature range lower than a solid oxide fuel cell operating temperature, and therefore, it is effective in avoiding a risk of breakage occurring usually near a glass transition temperature caused by stress.

In addition, according to one embodiment of the present specification, the composition for a sealant may have a softening temperature in a range of 550° C. to 700° C., and more preferably in a range of 600° C. to 700° C. According to one embodiment of the present specification, when the composition for a sealant has a softening temperature in a range of 550° C. to 700° C., it is a temperature and viscosity region readily exhibiting effects by additional additives such as a filler while having minimum viscosity for adhesion, which is effective in readily responding to technical problems near a solid oxide fuel cell operating temperature.

In the present specification, the softening temperature means a temperature at which a material starts to deform or soften by heating, and is measured using a dilatometer apparatus while observing changes obtained by thermal expansion measurement.

According to one embodiment of the present specification, the composition for a sealant may have an adhesion temperature in a range of 750° C. to 950° C., and more preferably in a range of 800° C. to 900° C.

In the present specification, the adhesion temperature means a temperature at which a sealant adheres to an upper surface and a lower surface of the cell of the fuel cell during a sealing process of the solid oxide fuel cell afterward. Specifically, the adhesion temperature refers to a temperature at which viscosity of the composition for a sealant according to one embodiment of the present specification becomes $10^4$ dPa·s.

One embodiment of the present specification provides a solid oxide fuel cell sealant including the composition for a solid oxide fuel cell sealant described above.

In other words, according to one embodiment of the present specification, the sealant may be manufactured using a composition for a sealant not including organic substances, and the sealant itself also does not include organic substances such as a solvent or a binder.

One embodiment of the present specification provides a method for manufacturing a sealant for a solid oxide fuel cell including providing the composition for a solid oxide fuel cell sealant described above; melting the composition for a sealant; preparing glass for a sealant by slowly cooling the melted composition for a sealant; preparing powder by crushing the glass for a sealant; preparing a product for a sealant by placing the powder in a mold and extrusion molding; and sintering the product for a sealant.

In the present specification, as for the composition for a solid oxide fuel cell, the descriptions provided above may all be identically applied.

In other words, according to one embodiment of the present specification, the composition for a solid oxide fuel cell may be formed with one or more materials selected from the group consisting of $SiO_2$, $B_2O_3$, $P_2O_5$, $Al_2O_3$, ZnO, CaO, BaO and SrO, and may not include organic substances such as a solvent or a binder.

Specifically, according to one embodiment of the present specification, the providing of the composition for a solid oxide fuel cell sealant may provide the composition for a solid oxide fuel cell sealant by preparing the glass-based material such as $SiO_2$, $B_2O_3$, $P_2O_5$, $Al_2O_3$, ZnO, CaO, BaO and SrO described above in a proper content, and mixing them without using organic substances.

In addition, according to one embodiment of the present specification, the melting of the composition for a sealant may include heating the glass-based material such as $SiO_2$, $B_2O_3$, $P_2O_5$, $Al_2O_3$, ZnO, CaO, BaO and SrO described above until it has a liquid form, and may be carried out by increasing the temperature from room temperature to a range of 1200° C. to 1400° C.

According to one embodiment of the present specification, in the preparing of glass for a sealant by slowly cooling the melted composition for a sealant, the slow cooling may include, in a heat treatment process, a process of slowly cooling at a high temperature, or a process of reheating to a certain temperature and slowly cooling.

In addition, one embodiment of the present specification may include, after preparing glass for a sealant by slowly cooling the melted composition for a sealant, preparing powder by crushing the glass for a sealant again, and by placing the powder prepared as above in a mold and extrusion molding, a product for a sealant in a desired shape may be obtained without requiring a separate process of preparing to a tape or paste form.

In other words, according to one embodiment of the present specification, a product for a sealant having a desired structure may be prepared depending on the shape of a mold placing the powder, and a sealant having a ring shape may be prepared by employing a shape inside a mold as a ring shape.

In other words, the shape inside a mold may be made or prepared so as to correspond to a shape of a sealant to prepare, and although the structure is preferably a ring shape generally, the shape is not particularly limited.

In addition, according to one embodiment of the present specification, the material placed inside a mold is formed only with a glass-based material as described above and does not include organic substances such as a solvent and/or a binder, and therefore, there is an advantage in that a separate organic substance preparation process is not required.

According to one embodiment of the present specification, the sintering of the composition for a sealant may be carried out at a temperature range of higher than or equal to the softening temperature described above and lower than or equal to the softening temperature+30° C. Carrying out the sintering at a temperature higher than or equal to the softening temperature is effective in manufacturing a sealant denser than a pore structure, and carrying out the sintering at a temperature lower than or equal to the softening temperature+30° C. is effective in preventing sealant shape collapse occurring during a sintering process, a problem of adhesion with a support, or defects of breakage caused by cooling after adhesion.

According to one embodiment of the present specification, a sealant having excellent chemical durability and/or long-term durability may be manufactured through the sintering of the composition for a sealant.

One embodiment of the present specification provides a solid oxide fuel cell including a cell of a solid oxide fuel cell including a fuel electrode, an electrolyte and an air electrode; the solid oxide fuel cell sealant described above provided on an upper surface and a lower surface of the cell of the fuel cell; and a separator provided on an upper surface and a lower surface of the sealant.

A fuel cell formed with an electrolyte, an air electrode and a fuel electrode is referred to as a cell of a fuel cell (unit cell), and since the amount of electric energy produced by one unit cell is very limited, a laminated structure (stack) having a form of connecting unit cells in series is manufactured in order to use a fuel cell in power generation. In order to form a stack, an air electrode and a fuel electrode of each unit cell are electrically connected, and a separator is used to prevent mixing of fuel and air. Such a solid oxide fuel cell structure is mimetically illustrated in FIG. 1.

In foisting a laminated structure using the separator, a sealant is installed to prevent mixing of hydrogen gas, a fuel, and air, to prevent a gas leak and for insulation between cells. A solid oxide fuel cell may be divided into a flat plate-type, a cylinder-type, a laminate-type and the like, and although the shape is not particularly limited in the present specification, sealing between constituents and a separator is particularly important in a flat plate-type fuel cell.

In the present specification, as for descriptions on the fuel electrode, the electrolyte and the air electrode, descriptions generally used in the art may be used in the same manner.

In the present specification, as for descriptions on the solid oxide fuel cell, descriptions generally used in the art may be used in the same manner.

One embodiment of the present specification provides a method for manufacturing a solid oxide fuel cell including preparing a cell of a solid oxide fuel cell including a fuel electrode, an electrolyte and an air electrode; laminating the sealant for a solid oxide fuel cell described above on an upper surface and a lower surface of the cell of the solid oxide fuel cell; and heating a laminate laminating the sealant to each of the upper surface and the lower surface of the cell of the solid oxide fuel cell.

According to one embodiment of the present specification, the heating is preferably carried out in a range of 750° C. to 850° C. In order to have an adhesive property, the sealant for a solid oxide fuel cell according to one embodiment of the present specification forms proper viscosity through the heating of a laminate resulting in wetting at the upper surface and the lower surface of the cell of the fuel cell, and by behaving in a similar manner as a solid after cooling the same, sealing of the solid oxide fuel cell may be accomplished.

Hereinafter, the present specification will be described in detail with reference to examples in order to specifically describe the present specification. However, the examples according to the present specification may be modified to various different forms, and the scope of the present specification is not construed as being limited to the examples described below. The examples of the present specification are provided in order to more fully describe the present specification for those having average knowledge in the art.

EXAMPLE

Examples 1 to 4

Manufacture of Sealant

Raw materials of each component were combined so as to have compositions (based on mol %) listed in the following Table 1, and the result was melted through heating for 5 hours at a temperature of 1200° C. using a platinum crucible. During the melting, a platinum stirrer was inserted, and the result was stirred for 1 hour to homogenize glass. Subsequently, the melted glass was slowly cooled at 600° C. to obtain glass of each example. Meanwhile, the obtained glass was crushed, and then the particles were sorted by sizes of 10 µm to 20 µm level and selectively used. The result was extrusion molded to have a shape in which only a cell shape edge is present using a press method, then heated to a temperature higher than a softening point of each composition by 30° C., and maintained for 30 minutes to manufacture a sealant. A shape of a final sealant manufactured as above is illustrated in FIG. 2.

Manufacture of Fuel Cell

1. Slurry Preparation

Solid electrolyte slurry was prepared by mixing an electrolyte with a dispersant, a plasticizer and an acryl-based binder. In addition, negative electrode support layer slurry was prepared by mixing an electrolyte with NiO, a pore forming agent, a dispersant, a plasticizer and an acryl-based binder.

2. Tape Preparation and Lamination

The prepared slurry was coated on a doctor blade to prepare a solid electrolyte layer, a negative electrode functional layer, and a negative electrode support layer tape. Each tape was laminated to prepare a laminate for a solid oxide fuel cell (SOFC).

3. Sintering

The laminate for a solid oxide fuel cell was sintered in a range of 1000° C. to 1600° C. to form an electrolyte and a fuel electrode.

4. Air Electrode Preparation

An air electrode material and ESL441 as a binder were prepared into a paste using a 3 roll mill. The air electrode composition paste was coated using a screen printing method and dried to form an air electrode, and then the result was sintered to prepare a cell.

5. Sealing and Driving

After placing a sealant between a separating material and the prepared cell, the result was heated to 780° C., a sealing temperature, and then cooled to a temperature to operate.

Experimental Example 1

Measurement of Thermal Expansion Coefficient

For the glass of each of the examples, an average thermal expansion coefficient (CTE) was measured using a dilatometer.

Experimental Example 2

Measurement of Adhesion Temperature

For the glass of each of the examples, viscosity was measured using a high temperature viscometer, and a temperature T4 at which the viscosity became $10^4$ dPa·s was measured.

Experimental Example 3

Measurement of Glass Transition Temperature and Softening Temperature

For the glass prepared according to each of the examples, a glass transition temperature (Tg) and a softening temperature (Ts) were measured using a dilatometer.

Experimental results evaluating specific compositions of the compositions for a sealant according to Examples 1 to 4 of the present specification, and properties of the compositions are shown in the following Table 1.

TABLE 1

| | $SiO_2$ | $B_2O_3$ | $P_2O_5$ | $Al_2O_3$ | ZnO | CaO | BaO | SrO | Sum | T4 | Tg | Ts | CTE |
|---|---|---|---|---|---|---|---|---|---|---|---|---|---|
| Example 1 | 29.1 | 25.6 | 5 | 8.3 | 10.8 | 9.8 | 5.5 | 6.2 | 100 | 849 | 588 | 694 | 10.4 |
| Example 2 | 23.3 | 25.4 | 10 | 9.7 | 5.0 | 10.8 | 10.9 | 5 | 100 | 823 | 565 | 666 | 11.1 |
| Example 3 | 13.7 | 35.3 | 5 | 9.9 | 6.3 | 12.0 | 5.2 | 12.7 | 100 | 820 | 555 | 658 | 9.1 |
| Example 4 | 15.9 | 39.8 | 5 | 6.5 | 9.9 | 10.5 | 9 | 3.5 | 100 | 833 | 571 | 674 | 9.9 |

T4: Adhesion temperature (temperature at which viscosity became $10^4$ dPa · s) [unit: ° C.]
Tg: Glass transition temperature [unit: ° C.]
Ts: Softening temperature [unit: ° C.]
CTE: Thermal expansion coefficient [unit: $10^{-6}$/K]

Experimental Example 4

Performance of each of the fuel cells was measured using an existing sealant including an organic substance binder or a solvent and the sealant of the present disclosure, and adhesion statuses of the sealants were observed. Observation results are shown in FIG. 3.

Specifically, FIG. 3(a) shows a result of observing an adhesion status of the sealant manufactured using the composition for a sealant including an organic substance binder or a solvent as in preparation methods in the art, and (b) shows a result of observing an adhesion status of the sealant manufactured using the composition for a sealant according to one embodiment of the present specification. As shown in FIG. 3, it was seen that contact failure of the sealant caused by bubble generation was identified in FIG. 3(a), and a problem of bubble generation did not occur in FIG. 3(b).

The invention claimed is:

1. A composition for a solid oxide fuel cell sealant comprising $P_2O_5$ in 5 mol % to 10 mol % based on the content of the whole composition, $SiO_2$ in 12 mol % to 33 mol % based on the content of the whole composition, and having a softening temperature in a range of 550° C. to 700° C.

2. The composition for a solid oxide fuel cell sealant of claim 1, further comprising one or more materials selected from the group consisting of $SiO_2$, $B_2O_3$, $Al_2O_3$, ZnO, CaO, BaO and SrO.

3. The composition for a solid oxide fuel cell sealant of claim 1, comprising $SiO_2$ in 12 mol % to 33 mol %, $B_2O_3$ in 25 mol % to 40 mol %, the $P_2O_5$ in 5 mol % to 10 mol %, ZnO in 5 mol % to 11 mol %, CaO in 5 mol % to 12 mol % and BaO in 5 mol % to 10 mol %.

4. The composition for a solid oxide fuel cell sealant of claim 1, further comprising $Al_2O_3$ in greater than 0 mol % and less than or equal to 10 mol %.

5. The composition for a solid oxide fuel cell sealant of claim 3, further comprising SrO in greater than 0 mol % and less than or equal to 13 mol %.

6. The composition for a solid oxide fuel cell sealant of claim 3, which has a value adding up the content of the CaO and the ZnO in a range of 5 mol % to 20 mol %.

7. The composition for a solid oxide fuel cell sealant of claim 5, which has a value adding up the content of the BaO and the SrO in a range of 9 mol % to 18 mol %.

8. The composition for a solid oxide fuel cell sealant of claim 1, which has a coefficient of thermal expansion value in a range of $8 \times 10^{-6}$/K to $12 \times 10^{-6}$/K.

9. The composition for a solid oxide fuel cell sealant of claim 1, which has a glass transition temperature in a range of 450° C. to 600° C. after curing.

10. The composition for a solid oxide fuel cell sealant of claim 1, which has an adhesion temperature at which viscosity of the composition for a sealant becomes $10^4$ dPa·s in a range of 750° C. to 950° C.

11. The composition for a solid oxide fuel cell sealant of claim 1, which does not include organic substances.

12. A solid oxide fuel cell sealant comprising the composition for a solid oxide fuel cell sealant of claim 1.

13. A method for manufacturing a sealant for a solid oxide fuel cell comprising:
providing the composition for a solid oxide fuel cell sealant of claim 1;
melting the composition for a sealant;
preparing glass for a sealant by slowly cooling the melted composition for a sealant;
preparing powder by crushing the glass for a sealant;
preparing a product for a sealant by placing the powder in a mold and extrusion molding; and
sintering the product for a sealant.

14. A solid oxide fuel cell comprising:
a cell of a solid oxide fuel cell including a fuel electrode, an electrolyte and an air electrode;
the solid oxide fuel cell sealant of claim 12 provided on an upper surface and a lower surface of the cell of the fuel cell; and
a separator provided on an upper surface and a lower surface of the sealant.

15. A method for manufacturing a solid oxide fuel cell comprising:
preparing a cell of a solid oxide fuel cell including a fuel electrode, an electrolyte and an air electrode;
laminating the sealant for a solid oxide fuel cell of claim 12 on an upper surface and a lower surface of the cell of the solid oxide fuel cell; and
heating a laminate laminating the sealant to each of the upper surface and the lower surface of the cell of the solid oxide fuel cell.

\* \* \* \* \*